April 30, 1963  E. R. BLUE  3,087,250
RULE HOLDER
Filed Aug. 19, 1959
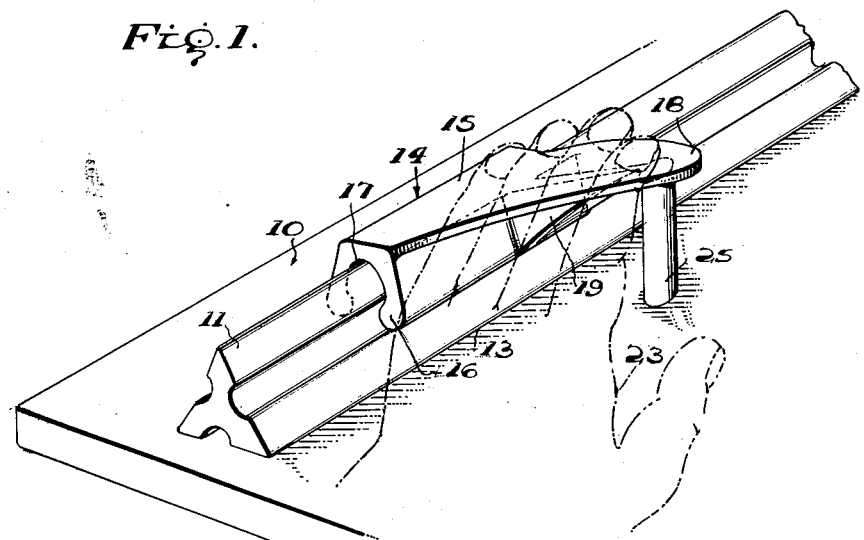
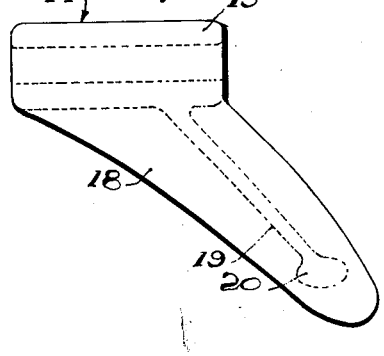
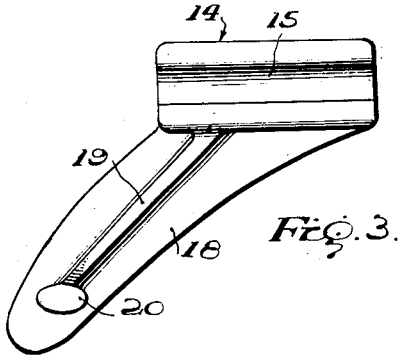
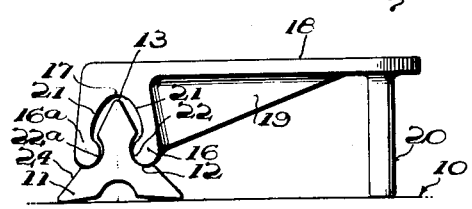
INVENTOR
*Emerald R. Blue.*
BY *W. J. Eccleston*
ATTORNEY

3,087,250
RULE HOLDER
Emerald R. Blue, 1443 Chapin St. NW., Washington, D.C.
Filed Aug. 19, 1959, Ser. No. 834,900
5 Claims. (Cl. 33—107)
(Granted under Title 35, U.S. Code (1952), sec. 266)

The invention described herein, if patented, may be manufactured and used by or for the Government for governmental purposes, without the payment to me of any royalty thereon.

My invention relates to a rule holder and more specifically to a rule holder for holding a triangular rule on a drawing surface that can be moved laterally along the rule.

In drafting, plotting or the like, the engineer or draftsman holds the rule on the drawing surface with one hand and by placing his fingers on the top edge of the same and measures or draws with the other hand. The edges of a triangular rule frequently are sharp and after prolonged use of the rule, the fingers of the user become so sensitive and uncomfortable due to holding the rule on one of its sharp edges that work must be stopped. Also, when the rule is in use, the holding hand is often in the way, and when the same is moved to permit an unobstructed view of the work, the rule is moved out of position.

It is therefore a primary object of my invention to provide a rule holder for holding a triangular rule on a drawing surface without touching the sharp edge of the rule.

Another object of my invention is to provide a rule holder which when in use will permit the user an unobstructed view of his work.

A further object of my invention is to provide a rule holder that can readily be moved laterally along the length of the rule.

Other objects and advantages of my invention will become apparent during the course of the following description wherein reference is had to the accompanying drawing forming a part of this application, in which like numerals are used to designate like parts throughout the various views and in which:

FIGURE 1 is a perspective view of my invention in use showing the holding fingers of the user in broken lines;

FIGURE 2 is a bottom plan view of the rule holder;

FIGURE 3 is a top plan view of the rule holder; and

FIGURE 4 is a side elevational view of my invention mounted on a rule.

In the drawing wherein for the purpose of illustration is shown a preferred embodiment of my invention, the numeral 10 designates a drawing surface upon which rests a triangular rule 11 having longitudinal grooves 12 and relatively sharp edges 13.

The rule holder generally indicated at 14 comprises an elongated, inverted U-shaped body member 15 having legs 16, 16a and a bight portion 17, and an off-set finger rest holding member 18 supported by rib 19 on its underside and a drawing surface engaging foot 20.

The inner surfaces of the legs 16 and 16a of the body member 15 are preferably bowed slightly as at 21 and terminate in rule engaging lobes 22 and 22a. When the lobes 22 and 22a are seated in the grooves 12 of the rule 11, the bight portion 17 of the body member 15 is raised slightly above the edge 13 of the rule 11 (see FIGURE 4).

The finger rest holding member 18 is an extension of the bight portion 17 of the body member 15, and protrudes therefrom at an oblique angle, away from the working edge 24 of the rule 11, as best seen in FIGURES 2 and 3, and is supported by the tapered rib 19 and the surface engaging foot 20. Positioning the finger rest 18 at an oblique angle to the body member 15 permits all of the fingers of the user to comfortably rest on the finger rest portion 18 without the necessity of placing his arm parallel to the rule 11, which would obstruct his clear view of the working edge 24 of the rule 11 and would also be an uncomfortable and an unnatural position.

In operation, the rule holder 14 is slid on the triangular rule 11 at one end thereof. The fingers 23 of the left hand of the user rest on the top of the finger rest holding member 18 (see FIGURE 1), leaving the right hand free to use a pencil (not shown) in association with the working edge 24 of the rule 11.

Due to the non-binding construction of the body member 15 (22, 22a, 21, 17), and the surface engaging leg 20, the rule holder 14 can be readily moved in the grooves 12 without moving the rule 11 by sliding it with the left hand.

It is to be understood that the form of the invention herewith shown and described is to be taken as a preferred embodiment of the same, and that various changes in the shape, size and arrangement of parts may be resorted to without departing from the spirit of my invention or the scope of the subjoined claims.

Having thus described my invention, I claim:

1. A rule holder adapted to slidably engage and hold a triangular rule on a drawing surface comprising an inverted U-shaped body having two legs and a bight portion, said legs positioned to engage opposite sides of a triangular rule and to support the bight portion slightly above the uppermost portion of the rule, a finger rest holding member extending outwardly from said body on the side opposite from the working edge of the rule, and a foot member carried by said finger rest holding member engaging said drawing surface thereby enabling said holder to be moved laterally along the rule and the drawing surface.

2. A rule holder according to claim 1, wherein said finger rest holding member is a lateral extension of said bight portion.

3. A rule holder adapted to hold a triangular rule having longitudinal grooves in each of its surfaces on a drawing surface comprising an inverted U-shaped body having two legs and a bight portion, said legs positioned to slidably seat in two of the rule grooves and support said bight portion slightly above the uppermost portion of the rule, a finger rest holding member extending outwardly from said bight portion of said body on a side opposite from the working edge of the rule, a reinforcing rib secured to one of said legs and to the underside of said finger rest holding member, and a foot member carried by said finger rest holding member engaging said drawing surface thereby enabling said holder to be moved laterally along the rule grooves and the drawing surface.

4. A rule holder adapted to hold a triangular rule on a drawing surface comprising an inverted U-shaped body having two legs and a bight portion, said legs being bowed slightly at their inner surfaces and terminating in rule-engaging lobes, said lobes being positioned to slidably engage opposite sides of a rule and to support said bight portion slightly above the uppermost portion of the rule, a finger rest holding member extending outwardly from said body on the side opposite from the working edge of the rule, and a foot member carried by said finger rest holding member engaging said drawing surface thereby enabling said holder to be moved laterally along the rule and drawing surface.

5. The combination with a triangular rule having longitudinal grooves in each of its surfaces; of a rule holder adapted to hold said rule on a drawing surface comprising a body having leg portions slidably engaging at least one of said longitudinal grooves and supporting said body above the drawing surface, a finger rest holding member projecting laterally at an oblique angle from the uppermost portion of said body above said drawing surface and away from the working edge of the rule, and a foot member carried by said finger rest holding member engaging said drawing surface thereby enabling said holder to be freely moved laterally in the longitudinal groove of the rule and along the drawing surface.

References Cited in the file of this patent

UNITED STATES PATENTS

| | | |
|---|---|---|
| 146,673 | Haslett | Jan. 20, 1874 |
| 616,943 | La Due | Jan. 3, 1899 |
| 2,178,755 | Johnson | Nov. 7, 1939 |
| 2,394,983 | Clarkson | Feb. 19, 1946 |
| 2,402,658 | Nedela | June 25, 1946 |
| 2,543,009 | Frost | Feb. 27, 1951 |